D. J. HANNA.
DOUGH WORKING APPARATUS.
APPLICATION FILED JAN. 20, 1912.
1,028,820.
Patented June 4, 1912.
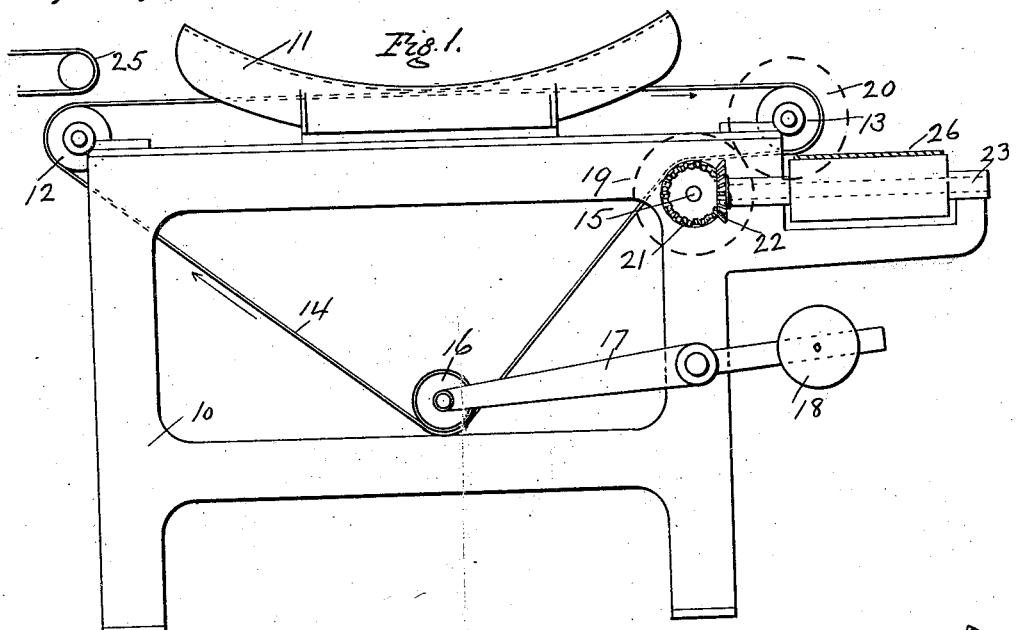
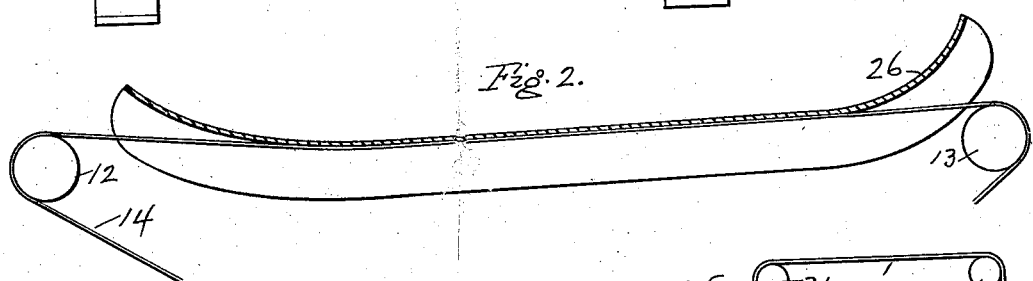
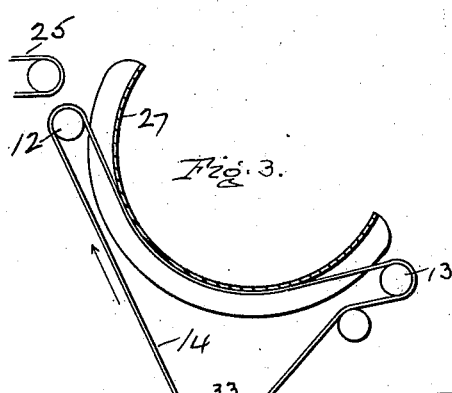
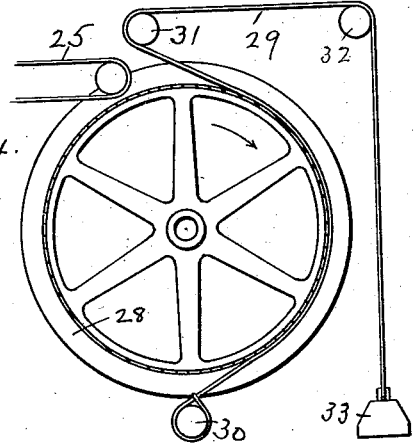
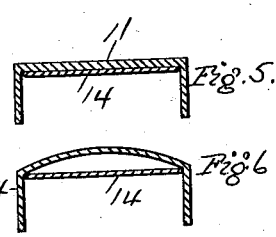
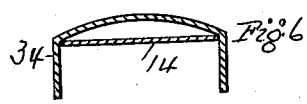
WITNESSES
L. H. Grote
M. E. Keis
INVENTOR
David J. Hanna
BY
Howson and Howson
his ATTORNEYS

UNITED STATES PATENT OFFICE.

DAVID J. HANNA, OF FISHKILL-ON-THE-HUDSON, NEW YORK.

DOUGH-WORKING APPARATUS.

1,028,820.

Specification of Letters Patent. Patented June 4, 1912.

Application filed January 20, 1912. Serial No. 672,326.

*To all whom it may concern:*

Be it known that I, DAVID J. HANNA, a citizen of the United States of America, and residing at Fishkill-on-the-Hudson, in the county of Dutchess and State of New York, have invented a certain new and Improved Dough-Working Apparatus, of which the following is a specification.

My invention relates to apparatus for working dough and particularly to an improved apparatus designed to work and shape dough, the object of my invention being to provide an improved apparatus which will have an improved working action upon the dough and which may be so employed as to expedite the preparation of the dough for the baking tins.

In the accompanying drawings, Figure 1 is a side elevation of an apparatus in which my invention is embodied in one form; Fig. 2 is a longitudinal section through portion of an apparatus of modified form; Figs. 3 and 4 are diagrammatic sections through further modified forms; and Figs. 5 and 6 are cross sections through working channels of different forms.

The present apparatus in the form illustrated in Fig. 1, comprises a supporting frame 10 carrying a longitudinally-curved, inverted trough-like member or form 11 mounted in stationary position on the top of the frame. Rollers 12 and 13 at the opposite ends of the frame support a traveling compression apron 14 which passes beneath the trough juxtaposed to the lower face thereof. From the roller 13, this belt passes over the driving roller 15, yielding tensioning roller 16 journaled on the end of a lever 17 which is pivoted on the frame and carries an adjustable counter-weight 18 by which the tension of the belt may be varied. If desired, the rollers 13 and 15 may be geared together, as diagrammatically illustrated by the dotted lines 19, 20, while bevel gearing 21, 22 may be arranged on the shaft of the roller 15 and the spindle 23 respectively to drive the roller 24 on the latter. In cross-section the trough 11 appears as a flat-bottomed channel section, as illustrated in Fig. 5.

Assuming the dough to have passed through the usual dividing or scaling machine, and to have been proofed sufficiently after balling, it is discharged from the conveyer belt 25 upon the apron 14 and carried on the latter beneath the stationary form 11. During its passage beneath the latter it is rolled over and over by the apron and is gradually transformed into cylindrical shape, its length being limited by the width of the trough. In this shape it is discharged upon the conveyer belt 26 passing over roller 24, by which it is carried to the sheeting rolls of the usual molding machine, to be there prepared for baking pans.

The action of the yielding, flexible compression belt 14 is far less harsh than the usual rigid rolls and the dough comes from the apparatus comparatively unaffected and requiring much less proofing than is ordinarily the case. The action of this flexible apron is in fact so gentle, especially if the apron is of soft material and the face of the trough is covered with like material, that the usual balling, proofing and molding operations may be eliminated and in their stead the chunks of dough discharged from the divider may be passed directly through the present apparatus from which they emerge shaped and ready for the baking pans. For this operation however, it is advisable that the arrangement of apron and form be such as to secure a longer working action upon the dough. Thus for an apparatus of the type shown in Fig. 1, the trough or form 26 is much lengthened and flattened so that the dough chunks are worked by the apron 14 three or four times as much as are the balls in Fig. 1.

In Fig. 3 form 27 is shaped on a curve and the rollers 12 and 13 are so arranged that the apron 14 hugs the form for the major portion of its length. In this arrangement the frictional advance of the material through the apparatus is assisted by gravity.

In Fig. 4 the driving members are reversed. Here the form takes the shape of a channeled wheel 28 driven from any suitable source, while the compression apron 29, though yieldable, does not travel, being secured at one end to the support 30 and passed over portion of the wheel 28 and idler pulleys 31, 32 to the tensioning weight 33 at its other end.

Any suitable cross-section may be given the trough; according to the shape which it is desired to impart to the final loaf. Thus in Fig. 6 I have shown the trough 34 concaved. This will have the effect of producing a loaf of greater diameter at the middle than at the end.

Various modifications of the apparatus will readily suggest themselves and I do not limit myself to the details of structure illustrated.

I claim as my invention:—

1. In apparatus of the character described, a form and a flexible, yielding compression apron juxtaposed thereto, in combination with means for moving said elements with relation to each other to work interposed dough, said apron being unsupported during the working portion of its travel, substantially as described.

2. In apparatus of the character described, a trough-shaped form and a flexible, yielding compression apron lying in said trough, in combination with means for moving said elements with relation to each other to work interposed dough, said apron being unsupported during the working portion of its travel, substantially as described.

3. In apparatus of the character described, a trough-like form having its web shaped to the desired contour of the finished dough, a flexible, yielding compression apron lying in such trough and means for moving said elements with relation to each other to work interposed dough, said apron being unsupported during the working portion of its travel, substantially as described.

4. In apparatus of the character described, a form and a flexible, yielding compression apron juxtaposed thereto, in combination with means for moving said elements with relation to each other to work interposed dough, at least one of said elements having its juxtaposed face of soft material, said apron being unsupported during the working portion of its travel, substantially as described.

5. In apparatus of the character described, a form and a flexible, yielding compression apron juxtaposed thereto, in combination with means for moving said elements with relation to each other to work interposed dough, both of said elements having their juxtaposed faces of soft material, said apron being unsupported during the working portion of its travel, substantially as described.

6. In apparatus of the character described, a form, a flexible apron, yieldable means tending constantly to hold said apron in contact with said form and means for moving said apron and form with relation to each other to work interposed dough, substantially as described.

In testimony whereof I have signed my name to this specification, in the presence of two subscribing witnesses.

DAVID J. HANNA.

Witnesses:
WALTER ABBE,
L. H. GROTE.

Copies of this patent may be obtained for five cents each, by addressing the "Commissioner of Patents, Washington, D. C."